Figure 1:
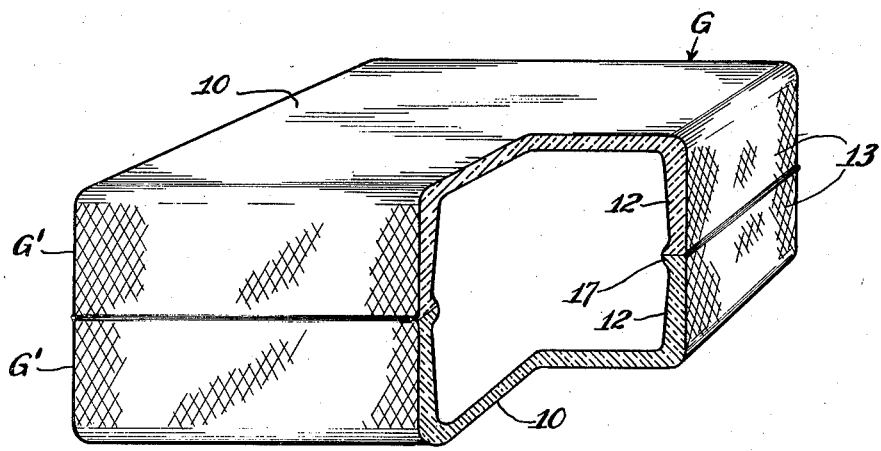

March 26, 1940.   R. W. KELL   2,194,756

HOLLOW GLASS ARTICLE

Original Filed Aug. 12, 1937

WITNESSES
A. B. Wallace.
A. H. Oldham.

INVENTOR.
Raymond W. Kell
BY  Brown, Critchlow & Flick
his ATTORNEYS.

Patented Mar. 26, 1940

2,194,756

UNITED STATES PATENT OFFICE 2,194,756

HOLLOW GLASS ARTICLE

Raymond W. Kell, Charleroi, Pa., assignor to Corning Glass Works, Corning, N. Y., a corporation of New York Original application August 12, 1937, Serial No. 158,732. Divided and this application November 3, 1938, Serial No. 238,611

3 Claims. (Cl. 72—41)

This invention relates to hollow glass articles, as for example building blocks such as are now being used in increasing amounts in the construction of interior and exterior walls, partitions and roofs, and for other structures and parts of them, and has particularly to do with such blocks or other glass articles made by first forming parts of them, and then fusing the parts to each other.

Heretofore in the manufacture of hollow glass building blocks it has been proposed to press form the parts of a hollow glass block, usually in halves, heat the meeting edges of these parts, and stick the plastic meeting edges of the parts together under pressure to form a hollow block. I have found, however, that in heating the continuous meeting edges of hollow block parts the heat tends to concentrate at the outer corners or portions of the edges. The result is that the bead formed when the edges of the parts are pressed together is largest at the outside of the block which is often undesirable. Furthermore, the inside corners or portions of the meeting edges of the blocks may even after prolonged heating with the usual ring burner be so cool that the parts can not be pressed together to form a good tight joint. Again, the heated air and hot gases of combustion must escape from the inside of the parts being heated with the result that the portions of the meeting edges adjacent the region of escape of the gases are cooled by the passing gases or are improperly heated due to deflection of the heating flames with the result that relatively cool spots are found in the meeting edges which do not seal satisfactorily.

It has been proposed, likewise, to dip the edges of the preformed block parts to be engaged into molten metal and to thereafter stick the edges together and allow the metal to solidify. This procedure involves extra manufacturing steps and material and results at best in the formation of a seal of lower strength than the glass itself. Due to the characteristics of the metal and the method by which the seal is made crystallization of the metal usually occurs to a greater or less extent and an air-tight block is seldom obtained.

Objects of my invention are to avoid and overcome the foregoing and other objections by the provision of improved sealed articles of hollow glass, as for example building blocks, having smooth external walls and a strong fused glass seal with substantially no external burr, and which articles may be efficiently and economically formed.

Figure 2:
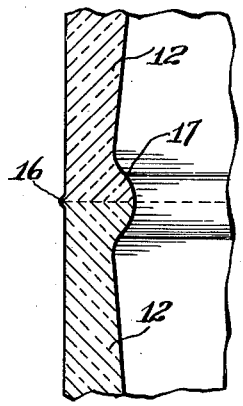
Figure 3:
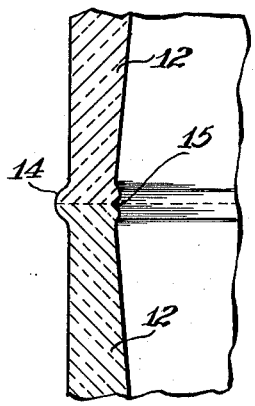

The invention may be best explained by reference to the accompanying drawing, in which Fig. 1 is a perspective view, partly broken away, of a building block embodying the principles of my invention; Fig. 2 is a fragmentary sectional view, on a larger scale, of the fused joint of the glass parts forming the article; and Fig. 3 is a fragmentary sectional view of a block formed by prior processes.

While as above indicated I contemplate forming various hollow glass articles from preformed parts, my invention particularly contemplates the manufacture of hollow building blocks and accordingly has been so illustrated and will be so described.

A typical block of hollow glass embodying the principles of my invention, indicated generally by the letter G and shown in Figs. 1 and 2, includes preformed complemental parts G'—G'. Each part G' includes a substantially flat face 10 which may be molded with any desired surface configuration, but which has been shown plain and having a continuous integral flange 12 surrounding the face. The flanges 12 may have roughened or coated outer surfaces 13 and are often made slightly thicker than the faces.

Heretofore, in the manufacture of hollow glass blocks, it has been customary to attempt to heat the entire flange edge of a glass section with a ring burner of substantially the same configuration. The use of such a burner alone inevitably results in uneven heating of the meeting edges, as previously explained, the outer portion usually being considerably hotter than the inner portion as well as varying in temperature from point to point about the circumference. When sections heated in this manner are pressed together to form a sealed hollow body, a certain amount of upsetting of the edges occurs, the soft hot glass being displaced laterally along the plane of the seal. Along the hotter outer edge of the seal the glass is sufficiently fluid to form a smooth surfaced, well rounded ridge, such as shown at 14 in Fig. 3, while the inner edge is usually so cool that the two corners fail to fuse together and as forced outwardly leave a sharply reentrant groove, such as shown at 15 in Fig. 3, while the inner edge is usually so cool that the two corners fail to fuse together and as forced outwardly leave a sharply reentrant groove, such as shown at 15 in Fig. 3 at the inner face of the seal.

Studies of the stresses to which glass building units are subjected when assembled into walls have established that the point of maximum loading is usually midway between the faces of the wall or along the seal of the block. Such compressive forces tend to bend the flanges inwardly and are augmented by the reduced pressure usually existing within the block. In the case of a seal such as shown in Fig. 3, two service weaknesses exist. Loading stresses tend to be concentrated by the external ridge 14 formed along the seal and the inner face, placed in tension by these stresses, contains the groove 15 at the point where the tensile stresses will normally be greatest. It is well known that stresses tend to concentrate and multiply about a nick or flaw in a stressed surface materially reducing its inherent strength. A groove, such as 15, acts in this same manner and results in lowering the strength of the block materially below what might be expected from its wall thicknesses.

The present invention eliminates the faults of prior art structures by providing a block having little or no external ridge 16 (Fig. 2) to concentrate loading stresses on the seal and the majority of the glass in the region of the seal is displaced inwardly forming a relatively large smooth ridge 17 having no trace of a groove along the line of the seal.

Various types of apparatus ranging from hand tools to automatic presses and handling equipment may be employed to form the blocks containing the features of the present invention. However, a convenient and preferable apparatus and method for making the articles of my invention are disclosed and claimed in my co-pending application Serial No. 158,732 of which this application is a division.

A feature of the manufacture of hollow glass articles with the apparatus and method disclosed in my parent application is to remove the products of combustion from the interior of the glass parts G' during and even after heating. When, as in prior practice, the products of combustion or other hot gases are not removed from within the burner and the glass parts, it is impossible to prevent the gases from either blowing outwardly over the entire circumference of the piece or channeling through the ring of heating flame at localized points. If some portion of the ring of heating flame provided by the burner is slightly thinner or weaker than the rest, the hot gases at the inside of the glass parts pour through this portion of the flame and bend it away from engagement with the glass edge to be heated. Thus one portion of the edge of the glass part being heated may not be heated at all so that the glass parts can not be properly fused together. Where the burner flame is uniform the hot gases bend the entire ring of flame outwardly so that the outside corners of the meeting edges of the glass parts are most highly heated and the inside corners are relatively cool. When parts heated in this manner are joined together seals of the type shown in Fig. 3 are produced for the reasons given above.

By controlling the amount of gas withdrawn from the interior of the burner and glass parts, the engagement between the burner flames and the edges of the parts can be varied. When a considerable amount of gas is withdrawn the burner flames are bent slightly inwardly so that the inside corners of the edges of the glass parts are heated to the greatest extent. This is often desirable and is in fact the preferred manner of making the articles of the present invention for the reason that in pressing or fusing the parts or halves of the block together, little or no bead or burr is desired on the outside of the block. When so heated the customary pressing together of the heated edges of the flanges tends to displace the softer glass which being mainly at the inside of the line of joinder forms a bead or burr largely on the inside of the block. Withdrawal of a lesser amount of gas will direct the flame squarely against the edge of the flange heating both inside and outside corners uniformly. Furthermore, channeling out of the flame as heretofore described is eliminated in all cases by the controlled withdrawal of the hot gases within the parts and the meeting edges are uniformly heated circumferentially.

The concentration of heat on the inner edges of the flanges 12, in the preferred manner just explained, produces the burr formation heretofore particularly described, i. e., the heavy burr 17 on the inside of the block and substantially no burr, or only a very small burr 16, on the outside of the block. While the above-described technique is preferred due to certain inherent advantages, articles formed according to my invention may be made by uniformly heating the sections, joining them together and mechanically displacing the glass of the seal inwardly during or after the joining operation.

It will be recognized that the objects of my invention have been attained and that I provide an improved sealed article of hollow glass having new and useful structural characteristics. The articles are improved in appearance, sound and strong in structure, and economically made. When laid up into a wall an even pressure is exerted over the entire mortar-contacting faces and localized stresses in the block structure are reduced to a minimum lessening the danger of failure in service.

While in accordance with the patent statutes my invention has been described and illustrated in detail, it should be appreciated that my invention is not limited thereto or thereby, but is defined in the appended claims.

I claim:

1. An hermetically sealed hollow glass building unit adapted to be assembled in a masonry structure comprising preformed complemental glass parts integrally fused together in the mortar-contacting faces of said unit, said mortar-contacting faces being substantially smooth along the line of joinder, and a continuously convex, abnormally heavy burr of glass extending along the line of joinder on the inside of the block.

2. An hermetically sealed hollow glass building unit adapted to be assembled in a masonry structure comprising preformed glass parts integrally fused together in the mortar-contacting faces of said unit, and characterized by an abnormally large continuously convex burr of glass on the inside of the block along the line of joinder and an abnormally small continuously convex burr of glass on the outside of the block at the line of joinder.

3. An hermetically sealed hollow glass building unit adapted to be assembled in a masonry structure comprising preformed glass parts integrally fused together in the mortar-contacting faces of said unit, and characterized by a relatively large smooth burr of glass on the inside of the block along the line of joinder and a smaller smooth burr of glass on the outside of the block at the line of joinder, the combined thickness of the walls and burrs being greatest along the center line of the burrs.

RAYMOND W. KELL.